United States Patent [19]

Lane

[11] Patent Number: 5,607,265
[45] Date of Patent: Mar. 4, 1997

[54] RECIPROCATING ATTACHMENT FOR HAND DRILLS

[76] Inventor: Michael S. Lane, 8382 Atlanta St. #C, Huntington Beach, Calif. 92646

[21] Appl. No.: 385,155

[22] Filed: Feb. 7, 1995

Related U.S. Application Data

[63] Continuation-in-part of Ser. No. 159,313, Nov. 29, 1993, abandoned.

[51] Int. Cl.$^6$ .................................................. B23B 45/00
[52] U.S. Cl. ........................ 408/20; 30/392; 144/35.2; 144/48.6
[58] Field of Search ........................... 408/20; 144/1 E, 144/1 F, 35 A, 35.2, 48.5, 48.6; 173/29; 30/122, 392

[56] References Cited

U.S. PATENT DOCUMENTS

| | | | |
|---|---|---|---|
| 1,679,884 | 8/1928 | Thomas | 144/35 A |
| 2,436,692 | 2/1948 | Greene | 144/35 A |
| 2,567,856 | 9/1951 | Polk | 408/20 |
| 2,816,583 | 12/1957 | Hill | 144/35 A |
| 3,033,252 | 5/1962 | Atkinson | 30/392 |
| 3,585,719 | 6/1971 | Kivela | 30/392 |
| 3,807,242 | 4/1974 | Stone | 408/20 |

FOREIGN PATENT DOCUMENTS

| | | | |
|---|---|---|---|
| 230538 | 1/1944 | Switzerland | 30/392 |

*Primary Examiner*—Daniel W. Howell
*Attorney, Agent, or Firm*—Dennis W. Beech

[57] ABSTRACT

A device to change the rotation of a shaft such as in an electric hand drill to the reciprocating motion necessary to power a saw blade. The reciprocating attachment has a grooved shaft and saw blade holder connected by a bearing all of which are contained in a housing. As the grooved shaft is rotated the shape of the groove in the grooved shaft causes the saw blade holder to move in a reciprocal manner in a groove in the housing. This provides the motion necessary to use a hand drill to saw an object. Alternative versions of the device include the widening of the groove in the grooved shaft with the saw blade holder having a holder pin and an end retained in a holder groove to cause the reciprocal motion. In addition, an inclined disk may be mounted on the rotating disk shaft to engage the saw blade holder slot to cause the reciprocal motion.

34 Claims, 3 Drawing Sheets

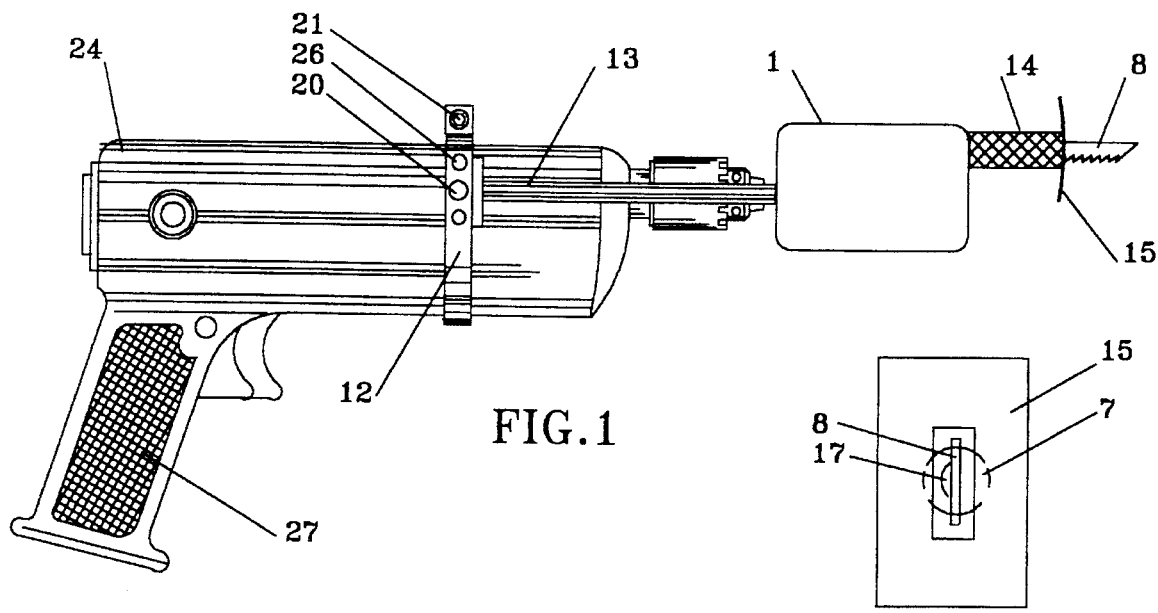
FIG.1
FIG.5
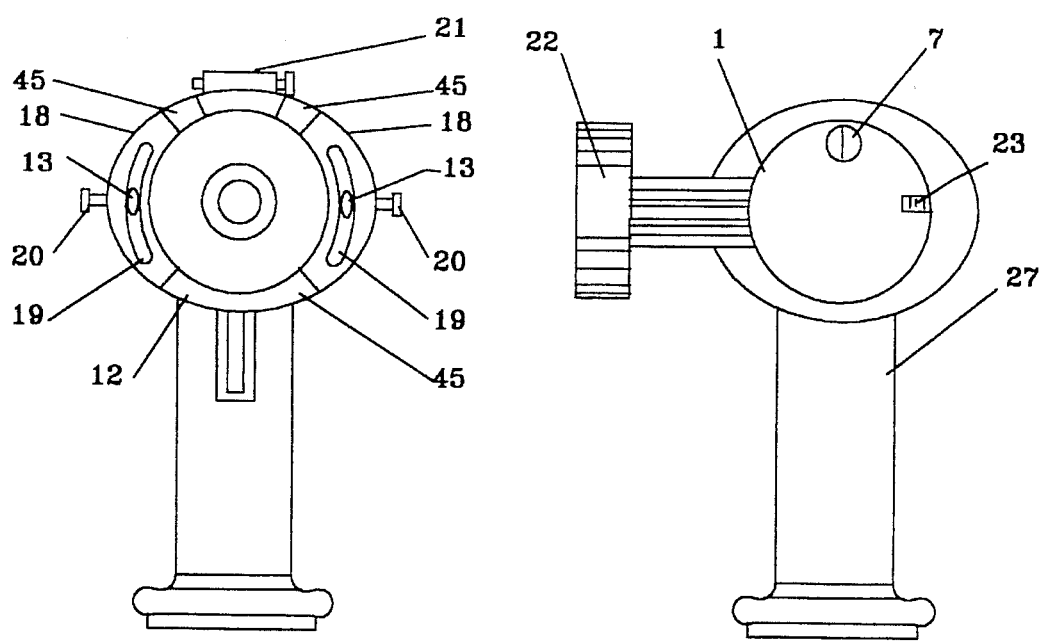
FIG.3
FIG.4

RECIPROCATING ATTACHMENT FOR HAND DRILLS

CROSS REFERENCES TO RELATED APPLICATION

This is a continuation-in-part of application Ser. No. 08/159,313 filed Nov. 29, 1993 now abandoned.

BACKGROUND OF THE INVENTION

1. Field of the Invention

This invention relates to devices used to translate rotational motion into reciprocal motion. Such devices are often used to convert an electric drill rotational motion to power a saw which requires a reciprocating force for purposes of cutting.

2. Description of the Prior Art

There are currently in use various holding devices and attachments to use the common electric drill for purposes other than drilling. Common uses are to use the drill to sand or polish. There are also methods to use the drill to power circular saws.

In addition there are devices in the art using gears, levers and cams in conjunction with holders for electrical drills to use the drills circular motion to drive saw blades. These devices generally use complicated, bulky methods to incorporate the electric drill into the reciprocating function. Those devices which may be mounted directly on the end of the drill involve complicate eccentric discs and levers to translate the motion.

There are also self contained, motor drive devices which provide for rotational as well as reciprocal motion. Again these devices use a rotational motor as in the hand drill and use complex gears, levers and cams to provide the reciprocal function.

The present invention to be mounted on the end of a rotational shaft such as an electric drill uses a simple grooved shaft or disk shaft mounted in a small housing with a saw blade holder to provide a portable reciprocating saw function on the end of a hand drill. No levers or gears are involved.

SUMMARY OF THE INVENTION

A primary objective of the invention is to translate rotational motion into reciprocal motion. A further object of this invention is to provide the motion translation in a convenient, portable means for use with a hand drill for use in sawing. Another object is to provide rapid saw reciprocal motion when using low rpm hand drills.

In accordance with the description presented herein, other objects of this invention will become apparent when the description and drawings are reviewed.

BRIEF DESCRIPTION OF THE DRAWING

FIG. 1 is a side view of the invention attached to a hand drill.

FIG. 3 is an end view of the device showing the drill retainer without the housing.

FIG. 4 is an end view of the invention with the handle.

FIG. 5 is an end view of the shield guard.

DESCRIPTION OF THE PREFERRED EMBODIMENT

The reciprocating attachment consists of a shaft having an eccentric groove or disk and a saw blade holder contained in a housing. The shaft and holder are interconnected by a bearing or pin such that when the shaft is rotated the saw blade holder reciprocates as a result of the relationship of the groove or disk in the shaft.

Figure 2:
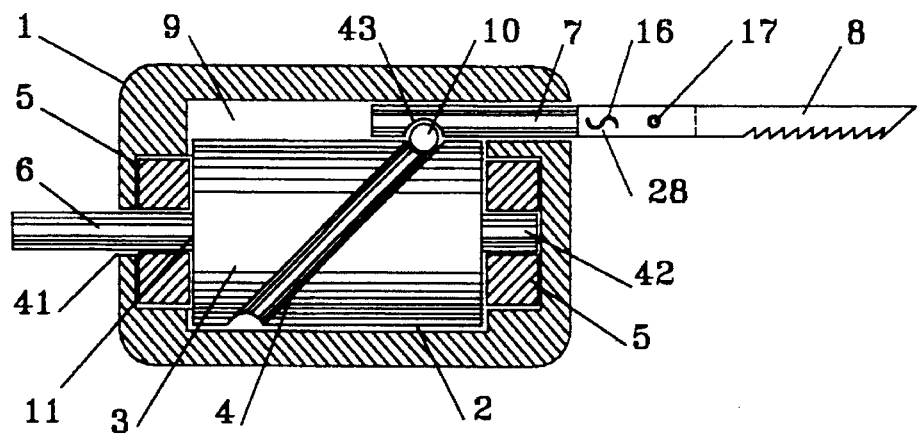
FIG. 2 is a sectional view of the invention substantially along the axis.

Referring to FIGS. 1 through 2, a housing (1) has a cylindrical chamber (2) and a slot (9) contained therein. There is a grooved shaft (3) mounted in the cylindrical chamber (2) with circular bearings (5) at the drill shaft (6) and mounting shaft (42) ends. The grooved shaft (3) rotates freely within the cylindrical chamber (2). Extending from a drill end center (11) of the grooved shaft (3) is a drill shaft (6). The drill shaft (6) extends through the housing (1) at the drill shaft aperture (41) and can be attached to the chuck of a hand drill as shown in FIG 1.

The slot (9) in the housing (1) has a saw blade holder (7) slidably mounted therein. The saw blade holder (7) is keyed or flat along a portion of its circumference to prevent rotation axially. The saw blade holder (7) has a saw bearing (10) mounted in a saw blade holder slot (43) attached such that the saw bearing (10) is cooperatively retained in the groove (4) of the grooved shaft (3). The non-circumferential shape of the groove (4) causes the reciprocating motion of the saw blade holder (7) as the grooved shaft (3) is rotated. A variety of saw blades (8) may be attached to the saw blade holder (7).

Referring to FIGS. 1 and 3, the housing (1) is retained on the drill (24) by a drill retainer (12) clamped to the drill (24) and attached to the housing by retainer bars (13) which retainer bars (13) are inserted in housing slots (25). The retainer bars (13) may be flat or crescent shaped to fit the curvature of the drill (24). The drill retainer (12) has a drill retainer clamp (21) to securely fasten to the drill (24). The drill retainer (12) may be covered by an elastic coating means (45) such as rubber, plastic or like material to provide a better grip on the drill (24) for safety.

The drill retainer (12) has expanded retainer bar brackets (18) opposite each other with retainer bar slots (19). The retainer bar (13) mounts in the retainer bar slot (19) and is fastened by a retainer bar pin (20). The retainer bar pin (20) may be a friction fit or may be threaded to clamp the retainer bar (13). There are a series of slot holes (26) in each retainer bar bracket (18) for insertion of the retainer bar pin (20). This allows different orientation of the housing (1) when mounted on the drill (24) relative to the drill handle (27). This provides for other than a vertical cut by the saw blade (8) when the drill handle (27) is held vertical.

An alternate method to having the retainer bar slots (19) as part of the drill retainer (12) is to have the housing slots (25) be of extended length with retaining bar pin (20) and slot holes (26). In this configuration the retaining bars (13)

are permanently fixed to the drill retainer (12). A further method is to have the retainer bars (13) fixed at the drill retainer (12) and the housing (1). Then to change the orientation of the saw blade (8) relative to the drill (24) the drill retainer clamp (21) may be loosened and the drill retainer (12) rotated relative to the drill (24).

Referring to FIG. 4 there is a housing handle (22) mounted to the housing (1) at the housing handle hole (23). This housing handle (22) provides a means to hold the housing steady when using the reciprocating attachment for hand drills.

Referring to FIGS. 2 and 5, a shield (14) with shield guard (15) is attached to the housing (1). The shield (14) provides safety to the saw blade (8) area and the shield guard (15) provides a surface to press against the material being cut for added stability. Also shown are a saw blade retainer (16) and a saw screw (17). The saw blade retainer (16) has an S shape to provide structure to hold the saw blade (8) which has an S shape slot (28) for the pressure and vibration forces created when sawing. The S shaped slot (28) of the saw blade retainer (16) which is an S shape protrusion for structural support between the saw blade holders (7) and the saw blade (8). The saw blade screw (17) retains the saw blade (8) to the saw blade holder (7) such that the saw blade (8) does not slip off of the saw blade retainer (16).

Figure 6:
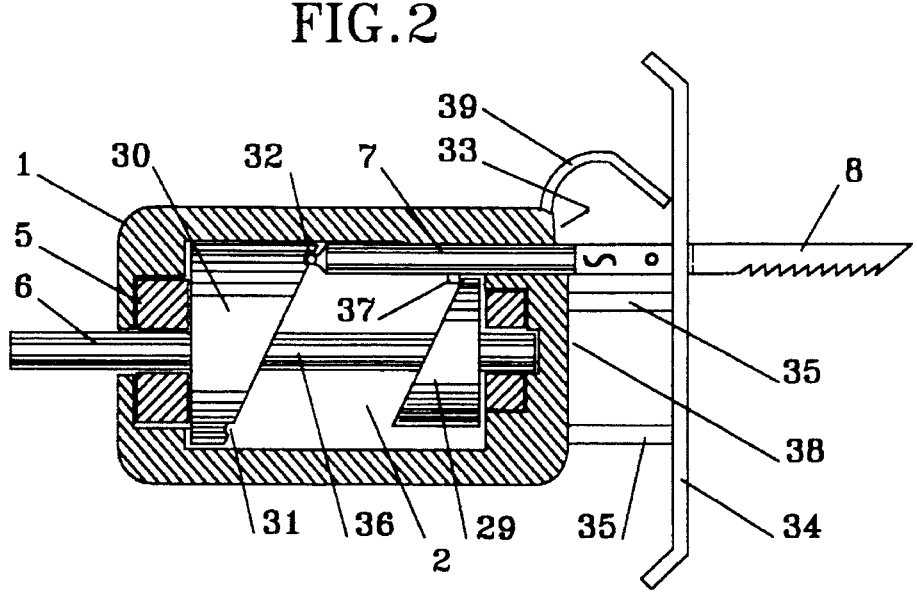
FIG. 6 is a sectional view of the housing with an expanded groove.

Referring to FIG. 6 an alternate embodiment of the grooved shaft (3) is disclosed. The groove shaft (3) has a widened groove (4) which has a front shaft (29) and rear shaft (30) with a grooved shaft spacer (36) in between. The rear shaft (30) has a saw blade holder groove (31). The saw blade holder (7) has an end (32) which fits in the saw blade holder groove (31). The saw blade holder (7) also has a holder pin (37) which mounts against the eccentric surface of the front shaft (29). As the grooved shaft (3) is rotated the saw blade holder (7) is reciprocated by the force on the end (32) and holder pin (37).

The housing (1) has a recess (33) to allow the saw blade holder (7) to be retracted further into the housing (1) relative to the front surface (38) of the housing (1). Also there is a work guard (34) mounted to the front surface (38) of the housing (1) by means of posts (35). There is also a wire guard (39) mounted to the housing (1) and work guard (34) to shield the reciprocating saw blade (8).

Figure 7:
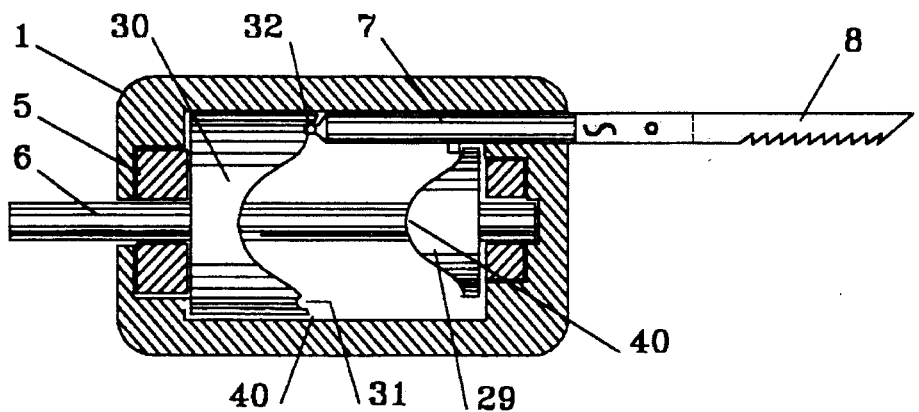
FIG. 7 is a sectional open view of the housing with a double action groove.

Referring to FIG. 7 an embodiment of the grooved shaft (3) is disclosed wherein there are two peaks (40) in the front shaft (29) and rear shaft (30). The eccentric shapes of the front shaft (29) and rear shaft (30) with the peaks (40) are oriented to work in a compatible manner to reciprocate the saw blade holder (7) twice during each rotation of the shaft (6). This feature provides for more rapid sawing action when a lower speed or rpm drill is used.

Figure 9:
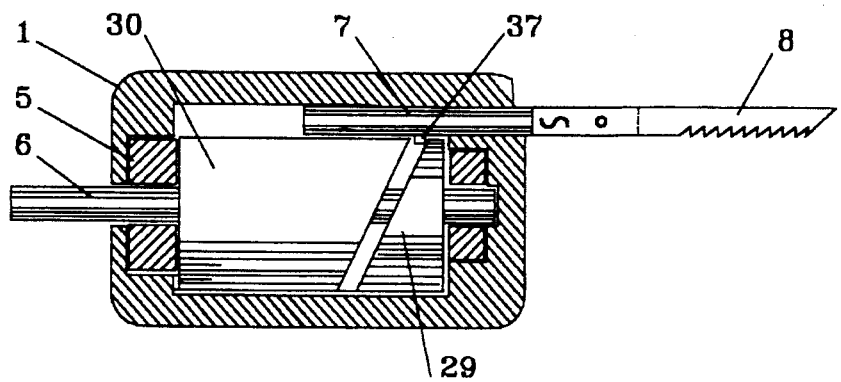
FIG. 9 is a sectional open view of the housing with a narrow groove and holder pin.
Figure 10:
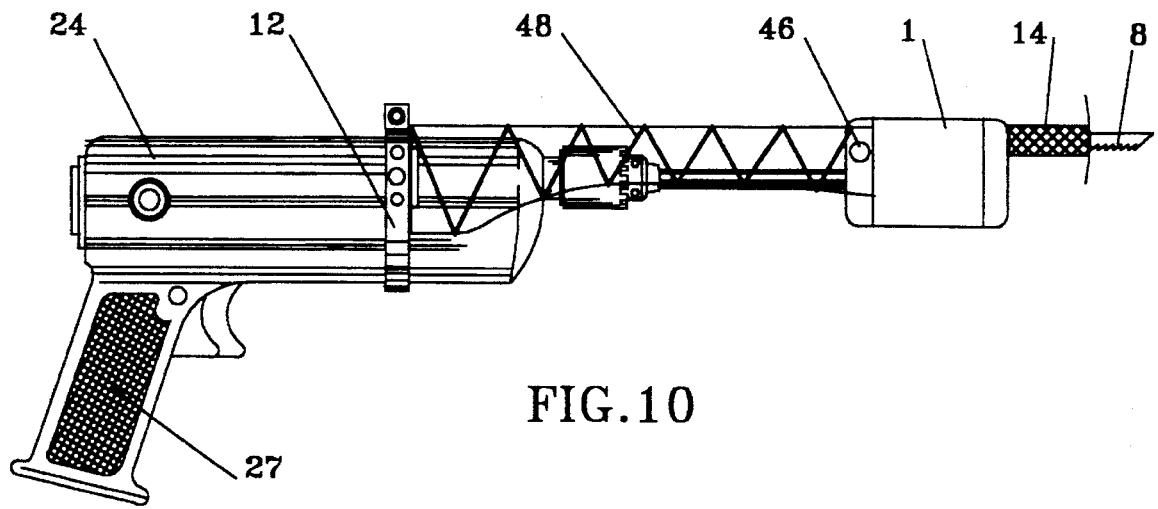
FIG. 10 is a side view of the invention attached to the hand drill with an alternate structural element.

Referring to FIG. 9, an embodiment of the grooved shaft (3) with a narrow shaft and a holder pin (37) is disclosed. In this alternative the end (32) on the saw blade holder (7) as disclosed in FIG. 6 has been eliminated. As the grooved shaft (3) is rotated the saw blade holder (7) is reciprocated by the movement of the holder pin (37). This provides a simpler mechanism from that of FIG. 6.

Figure 8:
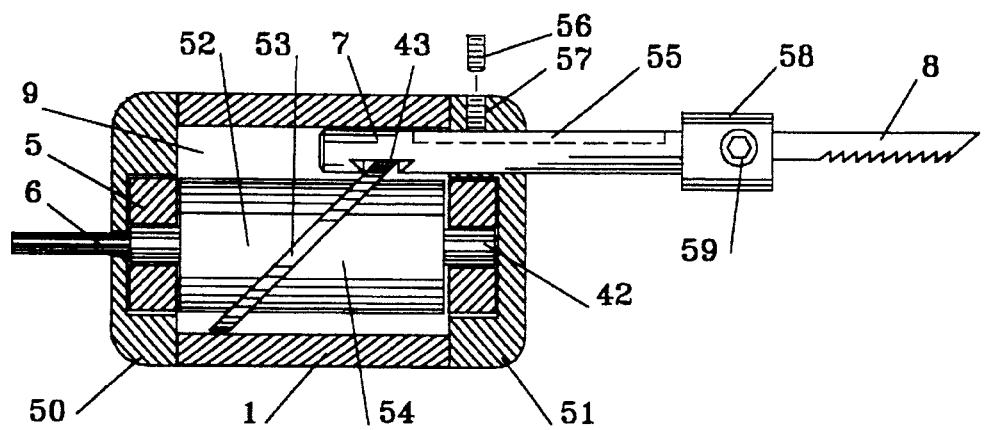
FIG. 8 is a sectional open view of the housing with a disk.

Referring to FIG. 8, an alternate embodiment using an eccentric or incline disk (53) mounted on a rotating disk shaft (52) provides the reciprocating motion. The disk (53) engages the saw blade holder slot (43) to translate rotational motion to reciprocal motion for the saw blade (8). The disk shaft (52) has a disk shaft flat (54) to prevent rotation of the disk (53) on the disk shaft (52).

FIG. 8 also discloses an alternate means to retain the saw blade (8). There is a saw blade clamp (58) through which a saw blade clamp screw (59) passes and also passing through an aperture in the saw blade (8) to then thread into a threaded screw hole (not shown) in the saw blade holder (7). There is also a saw blade holder set screw slot (55) in the saw blade holder (7) which is engaged by a set screw (56) threaded through the housing saw end (51) to prevent rotation of the saw blade holder (7). In this alternate embodiment a housing drill end (50) and a housing saw end (51) are attached at each end of housing (1).

I claim:

1. An apparatus for attachment to hand drills for driving reciprocating tools comprising:

a housing having a cylindrical chamber, a drill shaft aperture and a slot defined therein;

a grooved shaft axially and rotatably mounted in the cylindrical chamber by a bearing means with a drill shaft extending axially from a drill end center through the housing at the drill shaft aperture;

the grooved shaft having a groove defined therein with the groove eccentrically extending around the circumference of the grooved shaft;

a saw blade holder slidably mounted in the slot with a means to retain a saw blade; and a saw bearing cooperatively mounted between the saw blade holder in a holder slot defined therein and in the groove of the grooved shaft;

a drill retainer having a plurality of retainer bars attached to the housing in housing slots defined therein;

the drill retainer has a drill retainer clamp and a plurality of retainer bar brackets having a retainer bar slot defined therein; and the drill retainer having a plurality of slot holes defined therein through which a retainer bar pin may be inserted to retain the retainer bar.

2. The apparatus as in claim 1 wherein the drill retainer is covered with an elastic coating means.

3. The apparatus as in claim 1 wherein there is a saw blade retainer on the saw blade holder and the saw blade holder having a threaded screw hole defined therein; the saw blade having an S shaped slot defined therein mating to the saw blade retainer; and the saw blade having an aperture defined therein through which a saw screw passes to retain the saw blade to the saw blade holder.

4. An apparatus for attachment to hand drills for driving reciprocating tools comprising:

a housing having a cylindrical chamber, a drill shaft aperture and a slot defined therein;

a grooved shaft axially and rotatably mounted in the cylindrical chamber by a bearing means with a drill shaft extending axially from a drill end center through the housing at the drill shaft aperture;

the grooved shaft having a front shaft and a rear shaft with a grooved shaft spacer intermittent a cooperative front shaft eccentric surface and a rear shaft eccentric surface wherein the rear shaft eccentric surface having a saw blade holder groove defined therein; and a saw blade holder slidably mounted in the slot with a means to retain a saw blade and with an end and a holder pin.

5. The apparatus as in claim 4 wherein there is a drill retainer having a plurality of retainer bars attached to the housing in housing slots defined therein; the drill retainer has a drill retainer clamp and a plurality of retainer bar brackets having a retainer bar slot defined therein; and the drill retainer having a plurality of slot holes defined therein through which a retainer bar pin may be inserted to retain the retainer bar.

6. The apparatus as in claim 5 wherein the drill retainer is covered with an elastic coating means.

7. The apparatus as in claim 4 wherein there is a drill retainer having a semicircular structural member attached and the semicircular structural member attached to the housing by a plate screw in a housing aperture define therein.

8. The apparatus as in claim 4 wherein there is a saw blade retainer on the saw blade holder and the saw blade holder having a threaded screw hole defined therein; the saw blade having an S shaped slot defined therein mating to the saw blade retainer; and the saw blade having an aperture defined therein through which a saw screw passes to retain the saw blade to the saw blade holder.

9. The apparatus as in claim 4 wherein there is a work guard mounted to a front surface with a plurality of posts.

10. The apparatus as in claim 4 wherein the housing has a recess relative to a front surface.

11. The apparatus as in claim 10 wherein there is a wire guard.

12. The device as in claim 4 wherein there is a plurality of housing handle holes defined in the housing and a housing handle.

13. An apparatus for attachment to hand drills for driving reciprocating tools comprising:

a housing having a cylindrical chamber, a drill shaft aperture and a slot defined therein;

a grooved shaft axially and rotatably mounted in the cylindrical chamber by a bearing means with a drill shaft extending axially from a drill end center through the housing at the drill shaft aperture;

the grooved shaft having a front shaft and a rear shaft with a grooved shaft spacer intermittent a cooperative front shaft eccentric surface having two peaks and a rear shaft eccentric surface having two peaks wherein the rear shaft eccentric surface having a saw blade holder groove defined therein; and a saw blade holder slidably mounted in the slot with a means to retain a saw blade and with an end and a holder pin.

14. The apparatus as in claim 13 wherein there is a drill retainer having a plurality of retainer bars attached to the housing in housing slots defined therein; the drill retainer has a drill retainer clamp and a plurality of retainer bar brackets having a retainer bar slot defined therein; and the drill retainer having a plurality of slot holes defined therein through which a retainer bar pin may be inserted to retain the retainer bar.

15. The apparatus as in claim 14 wherein the drill retainer is covered with an elastic coating means.

16. The apparatus as in claim 13 wherein there is a drill retainer having a semicircular structural member attached and the semicircular structural member attached to the housing by a plate screw in a housing aperture define therein.

17. The apparatus as in claim 13 wherein there is a saw blade retainer on the saw blade holder and the saw blade holder having a threaded screw hole defined therein; the saw blade having an S shaped slot defined therein mating to the saw blade retainer; and the saw blade retainer having an aperture defined therein through which a saw screw passes to retain the saw blade to the saw blade holder.

18. The device as in claim 13 wherein there is a plurality of housing handle holes defined in the housing and a housing handle.

19. An apparatus for attachment to hand drills for driving reciprocating tools comprising:

a housing having a cylindrical chamber, a drill shaft aperture and a slot defined therein;

a grooved shaft axially and rotatably mounted in the cylindrical chamber by a bearing means with a drill shaft extending axially from a drill end center through the housing at the drill shaft aperture;

the grooved shaft having a front shaft and a rear shaft with a grooved shaft spacer intermittent a cooperative front shaft eccentric surface and a rear shaft eccentric surface;

a saw blade holder slidably mounted in the slot with a means to retain a saw blade and with a holder pin;

a drill retainer having a plurality of retainer bars attached to the housing in housing slots defined therein, the drill retainer has a drill retainer clamp and a plurality of retainer bar brackets having a retainer bar slot defined therein; and the drill retainer having a plurality of slot holes defined therein through which a retainer pin may be inserted to retain the retainer bar.

20. The apparatus as in claim 19 wherein the drill retainer is covered with an elastic coating means.

21. An apparatus for attachment to hand drills for driving reciprocating tools comprising:

a housing having a cylindrical chamber, a drill shaft aperture and a slot defined therein;

a grooved shaft axially and rotatably mounted in the cylindrical chamber by a bearing means with a drill shaft extending axially from a drill end center through the housing at the drill shaft aperture;

the grooved shaft having a front shaft and a rear shaft with a grooved shaft spacer intermittent a cooperative front shaft eccentric surface and a rear shaft eccentric surface;

a saw blade holder slidably mounted in the slot with a means to retain a saw blade and with holder pin; and a drill retainer having a semicircular structural member attached and the semicircular structural member attached to the housing by a plate screw in a housing aperture define therein.

22. An apparatus for attachment to hand drills for driving reciprocating tools comprising:

a housing having a cylindrical chamber, a drill shaft aperture and a slot defined therein;

a grooved shaft axially and rotatably mounted in the cylindrical chamber by a bearing means with a drill shaft extending axially from a drill end center through the housing at the drill shaft aperture;

the grooved shaft having a front shaft and a rear shaft with a grooved shaft spacer intermittent a cooperative front shaft eccentric surface and a rear shaft eccentric surface;

a saw blade holder slidably mounted in the slot with a means to retain a saw blade and with a holder Din;

a saw blade retainer on the saw blade holder and the saw blade holder having a threaded screw hole defined therein;

the saw blade having an S shaped slot defined therein mating to the saw blade retainer; and the saw blade having an aperture defined therein through which a saw screw passes to retain the saw blade to the saw blade holder.

23. An apparatus for attachment to hand drills for driving reciprocating tools comprising:

a housing having a cylindrical chamber, a drill shaft aperture and a slot defined therein;

a grooved shaft axially and rotatably mounted in the cylindrical chamber by a bearing means with a drill shaft extending axially from a drill end center through the housing at the drill shaft aperture;

the grooved shaft having a front shaft and a rear shaft with a grooved shaft spacer intermittent a cooperative front shaft eccentric surface and a rear shaft eccentric surface;

a saw blade holder slidably mounted in the slot with a means to retain a saw blade ad with a holder pin; and the housing has a recess relative to a front surface.

24. The apparatus as in claim 2 wherein there is a wire guard.

25. An apparatus for attachment to hand drills for driving reciprocating tools comprising:

a housing having a cylindrical chamber, a drill shaft aperture and a slot defined therein;

a grooved shaft axially and rotatably mounted in the cylindrical chamber by a bearing means with a drill shaft extending axially from a drill end center through the housing at the drill shaft aperture;

the grooved shaft having a groove defined therein with the groove eccentrically extending around the circumference of the grooved shaft;

a saw blade holder slidably mounted in the slot with a means to retain a saw blade;

a saw bearing cooperatively mounted between the saw blade holder in a holder slot defined therein and in the groove of the grooved shaft;

a drill retainer having a semicircular structural member attached and the semicircular structural member attached to the housing by a plate screw in a housing aperture define therein; and the drill retainer has a drill retainer clamp.

26. An apparatus for attachment to hand drills for driving reciprocating tools comprising:

a housing having a cylindrical chamber with a housing drill end and a housing saw end, a drill shaft aperture and a slot defined therein;

a disk shaft axially and rotatably mounted in the cylindrical chamber by a bearing means with a drill shaft extending axially from a drill end center through the housing at the drill shaft aperture;

the disk shaft having a disk shaft flat on its circumference and a disk circumferentially mounted on the disk shaft at an inclined angle relative to the axis of the disk shaft;

a saw blade holder with a saw blade holder slot defined therein and a means to retain a saw blade slidably mounted in the slot; and the saw blade holder having a saw blade holder set screw slot aligned with the housing saw end having a set screw hole defined therein into which a set screw is threaded.

27. The apparatus as in claim 26 wherein there is a drill retainer having a plurality of retainer bars attached to the housing in housing slots defined therein; the drill retainer has a drill retainer clamp and a plurality of retainer bar brackets having a retainer bar slot defined therein; and the drill retainer having a plurality of slot holes defined therein through which a retainer bar pin may be inserted to retain the retainer bar.

28. The apparatus as in claim 27 wherein the drill retainer is covered with an elastic coating means.

29. The apparatus as in claim 26 wherein there is a drill retainer having a semicircular structural member attached and the semicircular structural member attached to the housing by a plate screw in a housing aperture define therein.

30. The apparatus as in claim 26 wherein there is a saw blade clamp having a saw blade clamp aperture through which a saw blade clamp screw to retain the saw blade having an aperture defined therein passes to engage the saw blade holder having a threaded screw hole defined therein.

31. The apparatus as in claim 26 wherein there is a work guard mounted to a front surface with a plurality of posts.

32. The apparatus as in claim 26 wherein the housing has a recess relative to a front surface.

33. The apparatus as in claim 32 wherein there is a wire guard.

34. The device as in claim 26 wherein there is a plurality of housing handle holes defined in the housing and a housing handle.

* * * * *